(12) United States Patent
Watanabe et al.

(10) Patent No.: US 8,435,005 B2
(45) Date of Patent: May 7, 2013

(54) MANUFACTURING METHOD OF IMPELLER

(75) Inventors: Yujiro Watanabe, Hiroshima (JP);
Hideaki Takatani, Hiroshima (JP);
Kazuyoshi Miyagawa, Takasago (JP);
Masanori Masumoto, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 767 days.

(21) Appl. No.: 12/608,359

(22) Filed: Oct. 29, 2009

(65) Prior Publication Data

US 2010/0189568 A1  Jul. 29, 2010

(30) Foreign Application Priority Data

Jan. 27, 2009  (JP) ................................ 2009-015451

(51) Int. Cl.
*F04D 29/22* (2006.01)
(52) U.S. Cl.
USPC .......................................... 416/186 R; 29/889
(58) Field of Classification Search ............... 416/213 A, 416/186 R, 214 R; 29/889, 889.4
See application file for complete search history.

(56) References Cited

U.S. PATENT DOCUMENTS

| | | | | |
|---|---|---|---|---|
| 4,795,311 A * | 1/1989 | Arkhipov et al. | ......... | 416/186 R |
| 5,538,395 A * | 7/1996 | Hager | ........................... | 416/144 |
| 2003/0057263 A1 | 3/2003 | Beedon et al. | | |
| 2005/0211751 A1* | 9/2005 | Beedon et al. | ................. | 228/200 |

FOREIGN PATENT DOCUMENTS

| | | |
|---|---|---|
| DE | 38 31 692 | 3/1989 |
| JP | 53-109208 | 9/1978 |
| JP | 61-042479 | 2/1986 |
| JP | 5-202701 | 8/1993 |
| JP | 8-159088 | 6/1996 |
| JP | 2002-364588 | 12/2002 |
| JP | 2003-531731 | 10/2003 |
| JP | 2003-328989 | 11/2003 |
| WO | 01/83157 | 11/2001 |

OTHER PUBLICATIONS

European Search Report issued Jul. 7, 2010 in corresponding European Patent Application No. 09174484.7.
Japanese Office Action dated Nov. 16, 2010 in corresponding Japanese Patent Application No. 2009-015451 w/English translation.

* cited by examiner

*Primary Examiner* — Richard Edgar
(74) *Attorney, Agent, or Firm* — Wenderoth, Lind & Ponack, L.L.P.

(57) ABSTRACT

A manufacturing method of an impeller includes forming a plurality of blades integrally on a blade attachment surface of one of a disc and a cover, placing the cover on a floor so as to face up the blade attachment surface of the cover, disposing the disc on the cover so as to face down the blade attachment surface of the disc, and bonding the plurality of blades to the blade attachment surface of the other of the disc and the cover which is not formed integrally with the plurality of blades by using a bonding material.

10 Claims, 5 Drawing Sheets

MANUFACTURING METHOD OF IMPELLER

BACKGROUND OF THE INVENTION

I. Field of the Invention

The present invention relates to manufacturing method of an impeller used in a centrifugal rotor such as a centrifugal compressor.

Priority is claimed on Japanese Patent Application No. 2009-015451, filed on Jan. 27, 2009, the contents of which are incorporated herein by reference.

II. Description of the Related Art

As an impeller used for a centrifugal rotor such as a centrifugal compressor, an impeller (a closed impeller) is known to which a cover is attached, which includes a disc attached to a rotation shaft, a cover opposed to the disc so as to have a space, and a plurality of blades connecting the disc with the cover. In the cover-attached impeller, the space which is enclosed by the surfaces of the plurality of blades and surfaces of the cover and the disc which are opposed to each other, functions as a passage for compressing gas. The impeller provided in the centrifugal compressor is manufactured by a method such as integral molding by casting, bonding by welding, or bonding by brazing (or transient liquid phase diffusion bonding, solid-phase diffusion bonding).

Specifically, the integral molding is a method which involves integrally forming the cover, the blades, and the disc by the machining of materials. However, in the impeller generally provided in the centrifugal compressor, as the passage has a complex shape which is curved in both the axial direction (the rotation shaft direction) and the radial direction, the integral molding is difficult.

Bonding by welding is a method which involves bonding an integral member made by forming blades integrally with either a cover or a disc to the other one of the cover and the disc by welding, or involves bonding the blades, the cover, and the disc to each other by welding. In this case, it is necessary to insert a welding torch into a passage, and in a case where the passage is narrow, inserting it into the passage is difficult. Therefore, there is a problem in that welding defects are more likely to occur.

The bonding by brazing is a method used when a cover to which blades are attached is bonded to a disc, and involves disposing a brazing filler metal such as foil, powder, or wire at the bonding points, placing the cover and the disc to overlap with each other in the furnace, and bonding them by heating (for example, refer to JP-A-2003-328989). The bonding by brazing has an advantage in that it can be easily performed compared with the bonding by welding described above even in cases where the passage is narrow.

Figure 7:
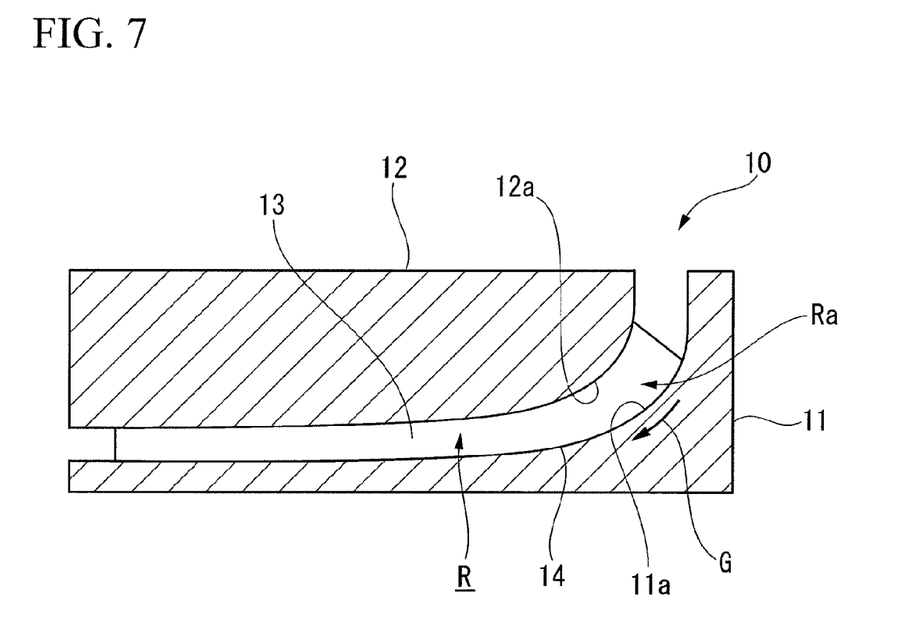
FIG. 7 is a side view illustrating a manufacturing process of an existing impeller.

Conventionally, an impeller, in which a portion around a rotation shaft (inner periphery) of a disc which is a bond part bonded with a blade, is formed with a curved surface in order to enhance aerodynamic performance. FIG. 7 is a side cross-sectional view illustrating the shape of an impeller having such a configuration. The impeller 10 illustrated in FIG. 7 has a passage R of which an outer peripheral side is formed along a radial direction by a disc 11 and a cover 12 and which increasingly curves toward the cover 12 in the direction toward the inner peripheral side. The disc 11 and the cover 12 are provided with curved surfaces 11a and 12a along a curved surface Ra of the passage R.

However, the structure of the existing impeller has the following problems.

In the above-mentioned impeller provided in the centrifugal compressor, tensile force acts on the bond part between the blade and the disc or the cover due to rotation in a direction in which the cover and the disc are separated from each other by centrifugal force, and bending stress occurs in a direction relative to the rotation direction. Accordingly, excess concentrated stress acts on the bond part corresponding to base portions of the blade and the disc. Particularly, in the bond part, rotation stress on the inner peripheral side in the radial direction increases.

Therefore, reliable bonding is required on the inner peripheral side of the bond part. However, in the case of the existing impeller 10 described above, in which the curved surface 11a is formed in the vicinity of the rotation shaft (inner periphery) of the disc 11 of the bond part with the blade 13 as illustrated in FIG. 7, bonding is performed in a state where the disc 11 faces down. That is, bonding is performed in a state where the outer peripheral side of the curved surface 11a of the disc 11 is lower than the inner peripheral side thereof. Accordingly, when the brazing filler metal 14 disposed between the blade 13 and the disc 11 is melted and liquefied, the brazing filler metal 14 flows from the inner peripheral side toward the outer peripheral side (in an arrow direction G) along the curved surface 11a. Therefore, the brazing filler metal 14 is insufficiently supplied to the inner peripheral side of the bond part, such that there is a problem in that the bonding strength of the bond part on the inner peripheral side, which requires a reliable bonding, is reduced.

The present invention is designed to solve the above-mentioned problems. An object of the present invention is to provide a manufacturing method of an impeller, which ensures bonding strength by preventing insufficient supply of bonding material.

SUMMARY OF THE INVENTION

According to an aspect of the present invention, there is provided a manufacturing method of an impeller which includes a disc, a cover opposed to the disc, a plurality of blades provided between the disc and the cover, and a plurality of passages formed between the disc and the cover, each of the passages having an inlet formed on a surface of the cover of the impeller and an outlet formed on an outer peripheral surface of the impeller, and the direction of each of the passages being changed so as to follow a radial direction of the impeller as it proceeds from the inlet to the outlet, the manufacturing method includes: forming the plurality of blades integrally on a blade attachment surface of one of the disc and the cover; placing the cover on a floor so as to face up the blade attachment surface of the cover; disposing the disc on the cover so as to face down the blade attachment surface of the disc; and bonding the plurality of blades to the blade attachment surface of the other of the disc and the cover which is not formed integrally with the plurality of blades by using a bonding material.

In addition, the impeller according to the present invention is manufactured by the above-mentioned manufacturing method of the impeller.

According to the present invention, the blade attachment surface of the cover is disposed to face up, so that the inner peripheral bond part end of the cover or the blade formed integrally with the cover, which is positioned at the curved portion of the passage, is disposed on the lower side of the curved portion. That is, the inner peripheral bond part end is disposed at a position on the downstream side when the bonding material is melted and flowed by heating and liquefied. Therefore, the bonding material which is melted during the bonding flows toward the inner peripheral bond part end and the two are bonded to each other. Accordingly, in the bond part on the inner peripheral side in the radial direction of the impeller, which is a bond part between the blade, the cover, and the disc and on which rotational stress is concentrated during the impeller operation, insufficient supply of the bonding material does not occur, such that it is possible to eliminate the problem of a reduction in the bonding strength.

A protruding portion or a recess portion may be provided near an inner peripheral bond part end where the passage is curved, in a bond part with the blades, on the blade attachment surface of the cover so as to prevent the bonding material from spilling.

In the case where the protruding portion is provided, the flow of the bonding material is stanched by the protruding portion during the bonding. In the case where the recess portion is provided, the bonding material flows into the recess portion. Accordingly, the flow of the bonding material is restricted. Therefore, it is possible to more reliably prevent spill out of the bonding material and increase the bonding strength of the bond part.

A surface opposite to the blade attachment surface of the cover may be made flat, and after the plurality of blades is bonded to one of the disc and the cover, the surface opposite to the blade attachment surface of the cover may be formed into a predetermined shape.

In this case, the cover can be disposed in a stable state by allowing the flat surface of the cover to face down. Accordingly, during the bonding, the bonding material uniformly flows toward the inner peripheral bond part end which is positioned at the curved portion of the passage along the curved surface of the cover or the blade which is formed integrally with the cover. In this aspect, the problem that the bonding material is partially insufficient can be eliminated, therefore more reliable bonding can be performed.

According to the manufacturing method of an impeller of the present invention, the bonding material which is melted during bonding is bonded while flowing toward the inner peripheral side of the bond part between the blade, and the cover or the disc. Therefore, it is possible to prevent insufficient supply of the bonding material on the inner peripheral bond part end, such that the bonding strength of the bond part can be ensured and the reliability of the bond part can be increased.

DETAILED DESCRIPTION OF THE INVENTION

A manufacturing method of an impeller according to an embodiment of the present invention will be described with reference to FIGS. 1 to 3.

Figure 1:
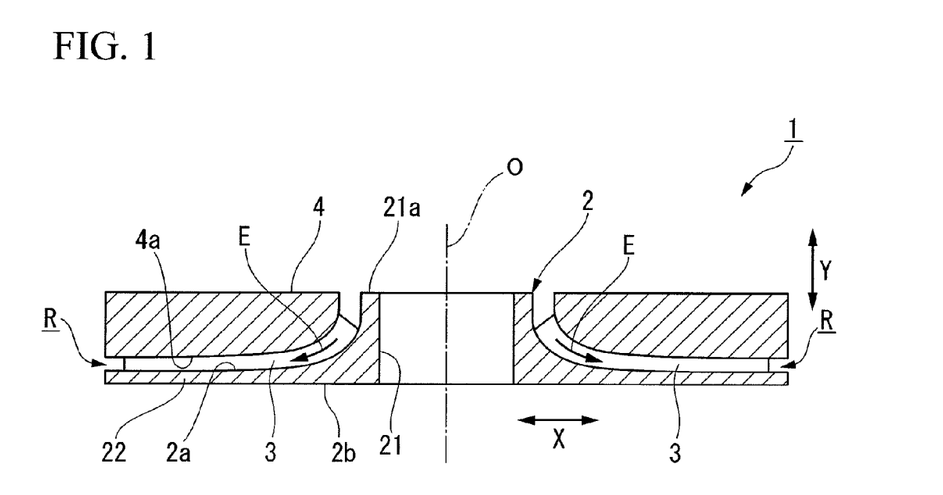
FIG. 1 is a side cross-sectional view schematically illustrating the configuration of an impeller manufactured by a manufacturing method of an impeller according to the present invention.

Reference numeral 1 in FIG. 1 denotes an impeller manufactured by the manufacturing method of the impeller according to the embodiment, and the impeller is mounted, as a rotor assembled with the rotation shaft, in a compressor such as a centrifugal compressor.

Figure 2:
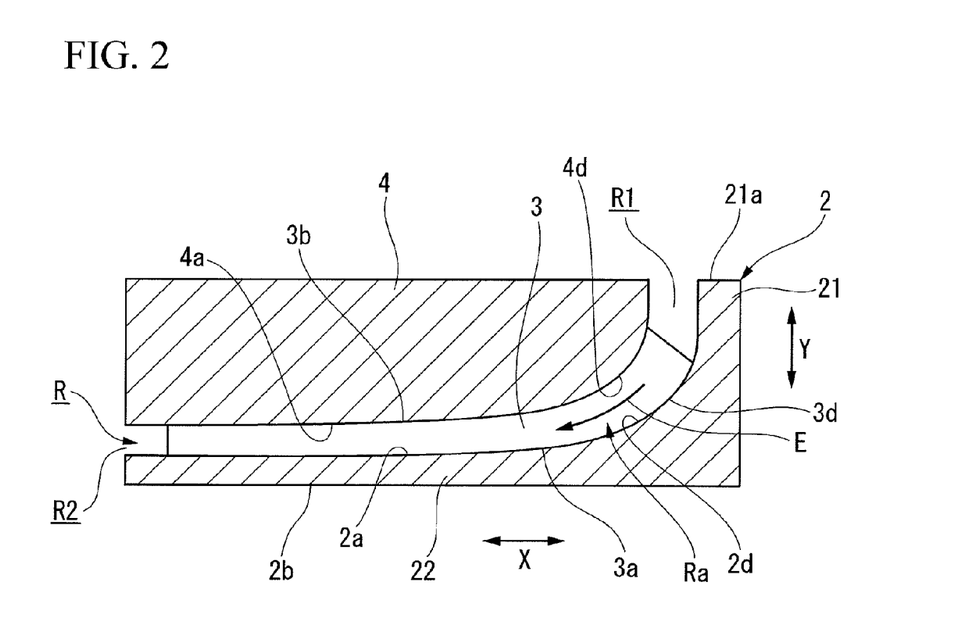
FIG. 2 is a partial enlarged view illustrating the impeller in FIG. 1.

As illustrated in FIGS. 1 and 2, the impeller 1 includes a disc 2 which has a substantially disc shape and is mounted coaxially with a rotation shaft (not shown), plural wing-shaped blades 3 of which ends are fixed to the disc 2 and which are arranged radially from the center axis O of the rotation shaft, a cover 4 which is opposed to the disc 2 so as to have a space and fixed to the other ends of the blade 3. A space, which is formed between the side surfaces of the blades 3 and the flow surfaces (surfaces opposed to each other) of the disc 2 and the cover 4, functions as a passage R for gas compressed by the compressor.

In addition, the right side on FIG. 2 when viewed from the plan view represents an inner peripheral side (on a side toward the center axis O illustrated in FIG. 1) of the impeller 1, and the left side represents an outer peripheral side. In addition, in FIGS. 1 and 2, with regard to a direction (an arrow direction E) in which gas flows in the passage R, the upper side on the plane represents an upstream side, and the lower side on the plane represents a downstream side. In addition, the rotation shaft direction of the impeller 1 is referred to as a Y direction, and similarly the radial direction is referred to as an X direction. This will be commonly applied in the following description.

The disc 2 forms the outer shape of the impeller 1, is made of metal such as carbon steel or stainless steel, and is constituted by a cylindrical portion 21 into which the rotation shaft (not shown) described above is inserted and a main body portion 22 which extends from an end (that is, the lower side from the planes of FIGS. 1 and 2) of the cylindrical portion 21 in the rotation shaft direction Y toward the outer peripheral side in the radial direction X. The cylindrical portion 21 and the main body portion 22 are formed integrally with each other. Here, in the disc 2, an upper surface (a side toward the passage R of gas) which is opposed to the cover 4 on the planes illustrated in FIGS. 1 and 2 is referred to as a front surface 2a, and a lower surface opposed thereto is referred to as a rear surface 2b in the following description. The front surface 2a of the main body portion 22 is curved from the outer peripheral side toward the inner peripheral side so as to gradually protrude in the rotation shaft direction Y toward a front end 21a of the cylindrical portion 21. That is, on the inner peripheral side of the front surface 2a of the disc 2, a curved surface 2d is formed which has a shape that follows a curved portion Ra of the passage R.

Each blade 3 provided between the disc 2 and the cover 4 is smoothly curved along the front surface 2a of the disc 2 toward the inner peripheral side in the radial direction (the arrow direction X) so as to protrude toward the front end in the rotation shaft direction (the arrow direction Y), and also curved on a side in the circumferential direction of the disc 2. The curved portion (the curved surface 3d) has a shape that follows the curved portion Ra of the passage R.

Here, in the blade 3, an edge disposed toward the disc 2 is referred to as a disc-side blade edge 3a, and an edge disposed toward the cover 4 is referred to as a cover-side blade edge 3b in the following description.

In this embodiment, the disc-side blade edge 3a of the blade 3 is formed integrally with the front surface 2a of the disc 2, and the cover-side blade edge 3b thereof is bonded to a blade attachment surface 4a of the cover 4 by brazing using a brazing filler metal 5 (bonding material) such as foil, powder, or wire. In addition, the bonding structure is not limited thereto, and in the case where the blade attachment surface 4a of the cover 4 is formed integrally with the cover-side blade edge 3b, a structure may be employed in which the disc-side blade edge 3a is bonded to the front surface 2a of the disc 2 by brazing using the brazing filler metal 5 such as foil, powder, or wire.

The lower surface (the blade attachment surface 4a) of the cover 4 is integrally fixed to the cover-side blade edge 3b of the blade 3, and curved from the outer peripheral side toward the inner peripheral side in the radial direction (the arrow direction X) so as to protrude toward the front end in the rotation shaft direction Y. That is, on the inner peripheral side of the blade attachment surface 4a of the cover 4, a curved surface 4d is formed which has a shape that follows the curved portion Ra of the passage R.

As described above, between the adjacent blades 3, the passage R is formed so as to generate compressed air with the rotation of the impeller 1, and the passage R is curved in both the rotation shaft direction Y and the circumferential direction according to the shapes of the disc 2, the blade 3, and the cover 4.

When the impeller 1 of the compressor, which is configured as described above is driven and rotated by a driving unit (not shown) about the center axis O, there is a flow of air, indicated by the arrow E, from the inner peripheral side to the outer peripheral side in the radial direction in the passage R, and the air is accelerated by centrifugal force generated by the rotation. Accordingly, air sucked from an inlet R1 of the passage R is compressed in the passage R and discharged from an outlet R2, and then sent to an external device (not shown) on the downstream side.

Next, a manufacturing method of the impeller 1 described above will be described with reference to FIG. 3 and so on.

Figure 3:
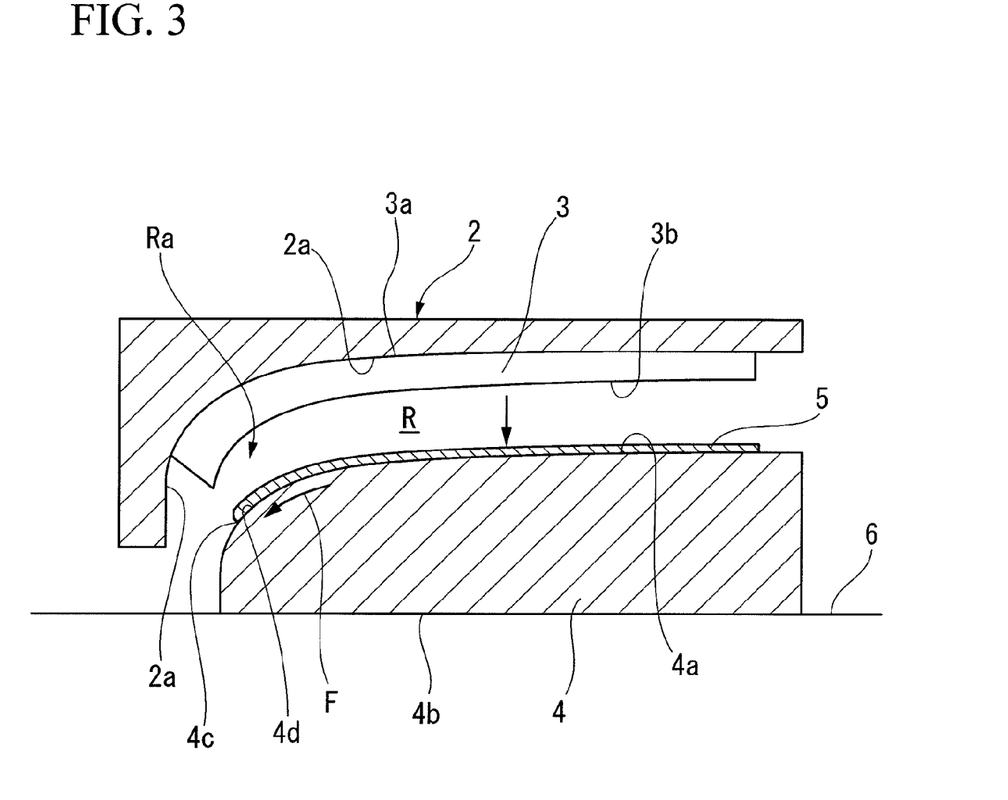
FIG. 3 is a side cross-sectional view illustrating a manufacturing process of the impeller.

First, as illustrated in FIG. 3, the disc 2 is formed integrally with the plural blades 3 by the machining of materials. A flat surface 4b is placed on the floor (bed) 6 such that the blade attachment surface 4a of the cover 4 faces up, and the brazing filler metal 5 is disposed on an attachment region of the blade attachment surface 4a of the cover 4, to which the blade 3 is to be attached. Subsequently, in the state where the disc 2 provided with the blades 3 is positioned on the cover 4, the blade attachment surface 4a of the cover 4 and the cover-side blade edge 3b of the blade 3 are bonded to each other using the brazing filler metal 5. Thereafter, a step is performed for finishing the flat portion 4b of the cover 4 into a predetermined shape.

Specifically, the cover 4 is disposed such that the blade attachment surface 4a of the cover 4 faces up, an inner peripheral bond part end 4c of the cover 4 positioned on the curved portion Ra of the passage R is disposed on the lower side of the curved potion Ra, and disposed at a downstream position of the brazing filler metal 5 that is melted by, for example, heating and liquefied. Accordingly, the brazing filler metal 5 that is melted during bonding flows toward the inner peripheral bond part end 4c (arrow direction F), so that the cover 4 and the blade 3 can be bonded to each other. That is, at the bond part between the blade 3 and the cover 4, which is a bond part on the inner peripheral side in the radial direction of the impeller 1 (see FIG. 1) on which rotational stress during the impeller operation is concentrated, sufficient supply of the brazing filler metal 5 is secured. Accordingly, it is possible to avoid the problem of a reduction in bonding strength.

In addition, in this embodiment, the side opposite to the blade attachment surface 4a of the cover 4 is the flat surface 4b, so that a stable state during the bonding can be achieved by allowing the flat surface 4b to face down. Accordingly, there is an advantage in that the brazing filler metal 5 uniformly flows toward the inner peripheral bond part end 4c along the curved surface 4d of the cover 4.

In addition, in this embodiment, during the bonding of the blade 3 and the cover 4, the brazing filler metal 5 is disposed on the blade attachment surface 4a of the cover 4. However, the disposition is not limited thereto, and the brazing filler metal 5 may be attached to the cover-side blade edge 3b of the blade 3.

In the manufacturing method of an impeller according to the first embodiment described above, since the brazing filler metal 5 is bonded while flowing toward the inner periphery from the bond part of the blade 3 and the cover 4 during bonding, it is possible to prevent an insufficient amount of the brazing filler metal 5 from being supplied to the inner peripheral bond part end 4c. Therefore, it is possible to ensure the bonding strength at the bond part and increase the reliability of the bond part.

Next, an embodiment modified from the above-mentioned embodiment will be described with reference to the accompanying drawings. Same elements or similar elements of the above-mentioned embodiment are denoted by same reference numerals, and a detailed description thereof will be omitted. Other configurations different from those of the embodiment will be described.

Figure 4:
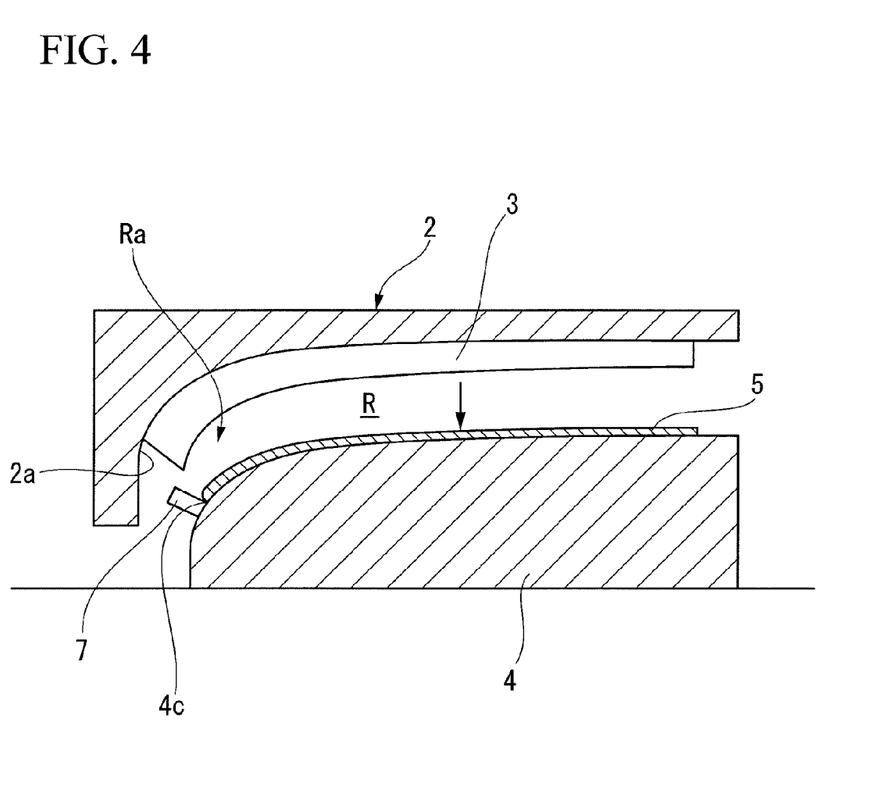
FIG. 4 is a side cross-sectional view illustrating a manufacturing process of an impeller according to a first modified embodiment.

The first modified embodiment illustrated in FIG. 4 is different from the manufacturing method of the above-mentioned embodiment in that a protruding portion 7 for preventing spill of the brazing filler metal 5 is provided on the inner peripheral bond part end 4c of the cover 4 which is positioned at the curved portion Ra of the passage R in the bond part with the blade 3. The protruding portion 7 protrudes from the inner peripheral bond part end 4c of the cover 4 toward the front surface 2a of the disc 2, and the length (in a direction perpendicular to the plane) thereof is equal to or greater than the width of the blade 3. The protruding portion 7 is provided during the bonding, and removed along with any excess thickness of the brazing filler metal 5 after the bonding. As described above, in the first modified embodiment having the protruding portion 7, the flow of the brazing filler metal 5 is restricted by the protruding portion 7 during the bonding, so that it is possible to reliably prevent the spill of the brazing filler metal 5. Therefore, there is an advantage in that it is possible to increase the bonding strength of the bond part of the cover 4 and the blade 3.

Figure 5:
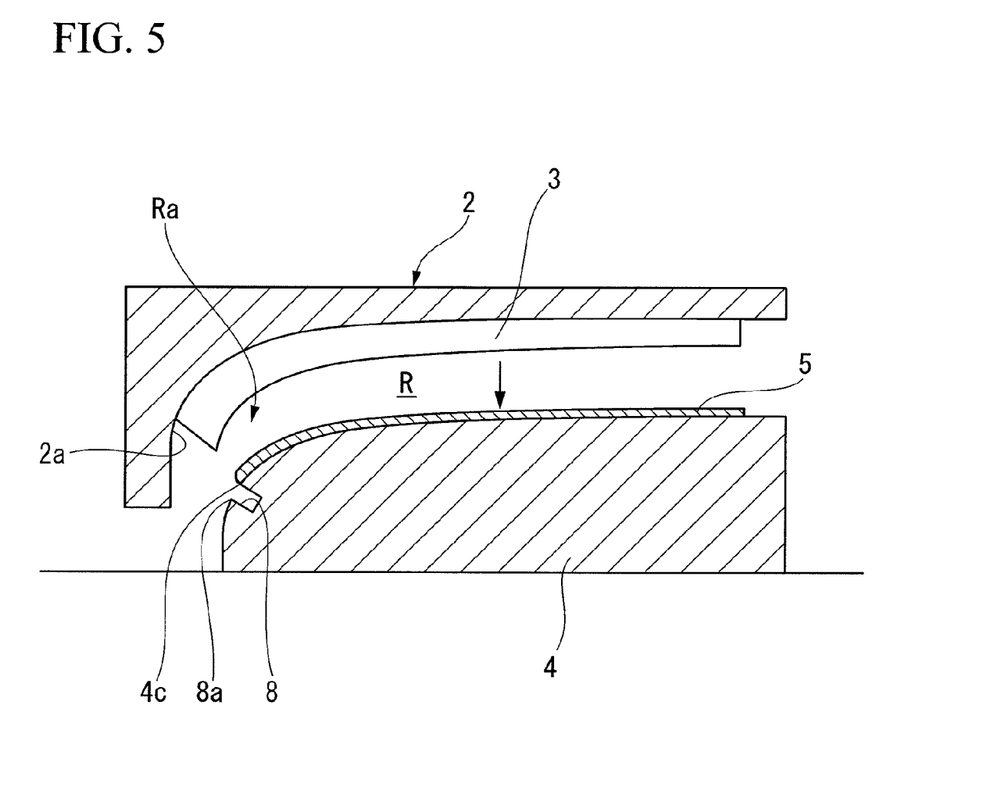
FIG. 5 is a side cross-sectional view illustrating a manufacturing process of an impeller according to a second modified embodiment.

Next, in the second modified embodiment illustrated in FIG. 5, instead of the protruding portion 7 (see FIG. 4) of the above-mentioned first modified embodiment, a recess portion 8 is provided. That is, the recess portion 8 is provided in the inner peripheral bond part end 4c of the cover 4 which is positioned at the curved portion Ra of the passage R in the bond part with the blade 3 so as to allow an opening 8a to face the front surface 2a of the disc 2 and has a function of preventing spill of the brazing filler metal 5 during manufacturing.

The length (in the direction perpendicular to the plane) of the recess portion 8 is equal to or greater than the width of the blade 3 (or the brazing filler metal 5 provided on the cover 4). The recess portion 8 is provided during the bonding. After the bonding, the brazing filler metal 5 that flows over the recess portion 8 is removed along with any excess thickness of the brazing filler metal 5 or processed so as to be suitably buried and brought back up. As described above, in the second modified embodiment having the recess portion 8, the brazing filler metal 5 flows into the recess portion 8 during the bonding, so that the flow thereof can be restricted. Therefore, as in the first modified embodiment described above, it is possible to reliably prevent the spill of the brazing filler metal 5 and increase the bonding strength of the bond part of the cover 4 and the blade 3.

Figure 6:
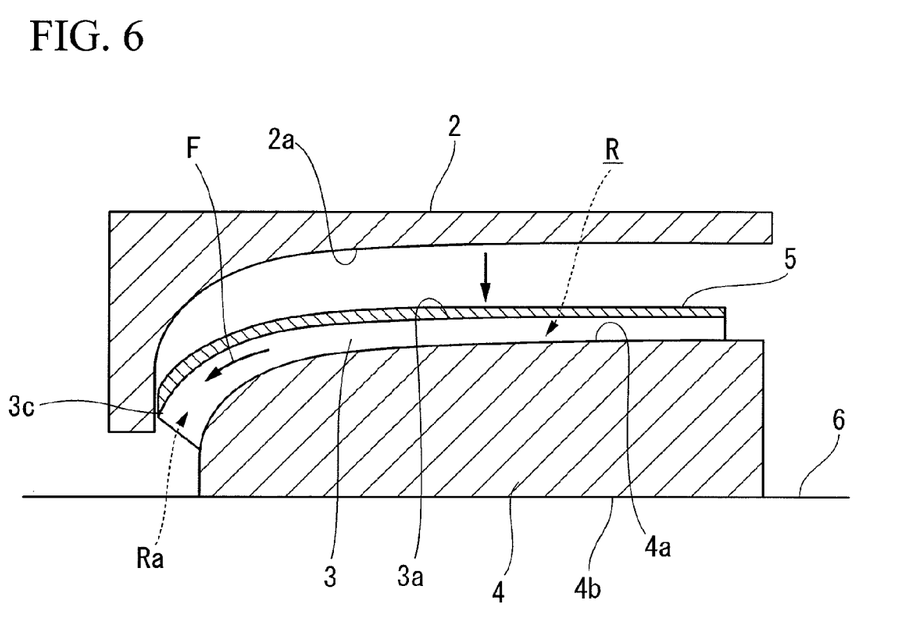
FIG. 6 is a side cross-sectional view illustrating a manufacturing process of an impeller according to a third modified embodiment.

A third modified embodiment illustrated in FIG. 6 replaces the manufacturing method of the above-mentioned embodiment.

Specifically, in the manufacturing method of an impeller according to the above-mentioned embodiment, the blade 3, which is formed integrally with the disc 2 in advance, is bonded to the cover 4. However, in the third modified embodiment, a flat surface 4b of a cover 4 formed integrally with a blade 3 in advance is placed on a floor 6, and in this state, a brazing filler metal 5 is disposed on a disc-side blade edge 3a of the blade 3, and the disc 2 is disposed on and bonded to the blade 3 (the brazing filler metal 5) using the brazing filler metal 5. In addition, the position of the brazing filler metal 5 is not limited to the disc-side blade edge 3a, and the brazing filler metal 5 may be attached to the front surface 2a of the disc 2 so as to bond the blade 3 and the disc 2 to each other.

In the third modified embodiment, the cover 4 is disposed such that the blade attachment surface 4a faces up, so that an inner peripheral bond part end 3c of the blade 3 which is positioned at the curved portion Ra of the passage R is disposed on the lower side of the curved portion Ra and on the downstream side of the brazing filler metal 5 which is melted by, for example, heating and liquefied. Therefore, the brazing filler metal 5 which is melted during the bonding flows toward the inner peripheral bond part end 3c (in an arrow direction F), so that the two members (the cover 4 and the blade 3) are bonded to each other. That is, at the bond part between the blade 3 and the disc 2, which is a bond part on the inner peripheral side in the radial direction of the impeller 1 (see FIG. 1) on which rotational stress during the impeller operation is concentrated, as in the above-mentioned embodiment, there are advantages in that insufficiency of the brazing filler metal 5 does not occur, and the problem of the reduction in the bonding strength can be eliminated.

While the manufacturing method of an impeller according to the embodiments and the modified embodiments of the present invention have been described and illustrated above, it should be understood that the present invention is not limited to the embodiments and the modified embodiments and can be modified without departing from the spirit and scope of the present invention.

For example, in the embodiment and the modified embodiments, bonding by brazing is employed. However, they are not limited thereto, and for example, transient liquid phase diffusion bonding may be employed.

In addition, in the embodiment and the modified embodiments, during the bonding, the cover 4 is configured such that the surface opposite to the blade attachment surface 4a is the flat surface 4b but is not limited to a shape with the flat surface 4b. The point is that in the impeller, the cover 4 may be disposed at a lower position in a stable state during the bonding of the members. Accordingly, during the bonding, the shape of the cover 4 may have an arbitrary finishing shape, and while this is in a stable state, the bonding may be performed.

In addition, the shapes and the sizes of the disc 2, the blade 3, and the cover 4 may be suitably set.

In addition, in the second modified embodiment, the protruding portion 7 is provided on the inner peripheral bond part end 4c of the cover 4. However, the position thereof is not limited thereto, and in the case of the cover 4 formed integrally with the blade 3 as in the above-mentioned second modified embodiment (see FIG. 6), a protruding portion protruding toward the blade attachment surface 4a of the cover 4 may be provided on the inner peripheral bond part end at a position attached to the blade 3 in the front surface 2a of the disc 2.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A manufacturing method of an impeller, which includes a disc, a cover opposed to the disc, a plurality of blades between the disc and the cover, and a plurality of passages between the disc and the cover, each of the plurality of passages having an inlet on a surface of the cover of the impeller and an outlet on an outer peripheral surface of the impeller, and the direction of each of the plurality of passages being changed so as to follow a radial direction of the impeller as each of the plurality of passages proceeds from the inlet to the outlet, the manufacturing method comprising:
    forming the plurality of blades integrally on a blade attachment surface of one of the disc and the cover;
    placing the cover on a floor so that the blade attachment surface of the cover faces in an upward direction;
    disposing the disc on the cover so the blade attachment surface of the disc faces in a downward direction;
    bonding the plurality of blades to the blade attachment surface of the other of the disc and the cover which is not formed integrally with the plurality of blades using a bonding material; and
    for each passage of the plurality of passages, forming an uneven portion proximal to an inner peripheral bond part end at a curved portion of the passage, in a bond part with the blades, on the blade attachment surface of the cover so as to prevent the bonding material from spilling.

2. The manufacturing method according to claim 1, wherein the uneven portion is a protruding portion or a recess portion.

3. The manufacturing method according to claim 2, wherein a surface opposite to the blade attachment surface of the cover is flat, and after the plurality of blades is joined to one of the disc and the cover, the surface opposite to the blade attachment surface of the cover is formed into a predetermined shape.

4. The manufacturing method according to claim 1, wherein a surface opposite to the blade attachment surface of the cover is flat, and after the plurality of blades is joined to one of the disc and the cover, the surface opposite to the blade attachment surface of the cover is formed into a predetermined shape.

5. The manufacturing method according to claim 1, wherein the uneven portion is a protruding portion.

6. The manufacturing method according to claim 5, wherein a length of the protruding portion is equal to or greater than a width of the blade.

7. The manufacturing method according to claim 5, further comprising removing the protruding portion after said bonding.

8. The manufacturing method according to claim 1, wherein the uneven portion is a recess portion.

9. The manufacturing method according to claim 8, wherein a length of the recess portion is equal to or greater than a width of the blade.

10. The manufacturing method according to claim 1, wherein during said bonding, the bonding material flows toward the inner peripheral bond end part.

\* \* \* \* \*